US012812691B2

(12) United States Patent
Abraham

(10) Patent No.: US 12,812,691 B2
(45) Date of Patent: Nov. 24, 2026

(54) METHOD AND SYSTEM FOR SELF OPTIMIZATION OF RANDOM ACCESS CHANNEL IN WIRELESS COMMUNICATION SYSTEM

(71) Applicant: SAMSUNG ELECTRONICS CO., LTD., Suwon-si (KR)

(72) Inventor: Aby Kanneath Abraham, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 253 days.

(21) Appl. No.: 18/711,080

(22) PCT Filed: Nov. 16, 2022

(86) PCT No.: PCT/KR2022/018109
§ 371 (c)(1),
(2) Date: May 16, 2024

(87) PCT Pub. No.: WO2023/090855
PCT Pub. Date: May 25, 2023

(65) Prior Publication Data

US 2025/0024507 A1 Jan. 16, 2025

(30) Foreign Application Priority Data

Nov. 16, 2021 (IN) ............................. 202141052478
Nov. 6, 2022 (IN) ............................. 202141052478

(51) Int. Cl.
*H04W 74/0833* (2024.01)
*H04W 74/0836* (2024.01)
*H04W 74/0838* (2024.01)

(52) U.S. Cl.
CPC .... *H04W 74/0833* (2013.01); *H04W 74/0836* (2024.01); *H04W 74/0838* (2024.01)

(58) Field of Classification Search
CPC ......... H04W 74/0833; H04W 74/0836; H04W 74/0838
See application file for complete search history.

(56) References Cited

U.S. PATENT DOCUMENTS

2010/0238831 A1 9/2010 Jeong et al.
2019/0028905 A1 1/2019 Veeramallu et al.
(Continued)

FOREIGN PATENT DOCUMENTS

CN 109275157 A 1/2019
CN 110753324 A 2/2020
(Continued)

OTHER PUBLICATIONS

Supplementary European Search Report dated Jan. 24, 2025, in connection with European Patent Application No. EP22896060.5, 12 pages.
(Continued)

*Primary Examiner* — Kent Krueger

(57) ABSTRACT

The disclosure relates to a 5G or 6G communication system for supporting a higher data transmission rate. Specifically, the disclosure related to method for self-optimization of random access channel (RACH) in a wireless network (300). The method includes storing, by a User Equipment (UE) (100), a feature specific RACH information corresponding to a feature specific RACH applied by the UE (100). The feature specific RACH is applied for one of a Small Data Transmission (SDT), coverage enhancement, a Reduced Capacity (Redcap), and network slicing. Further, the method includes sending, by the UE (100), the feature specific RACH information to a network device (200) in the wireless network.

16 Claims, 4 Drawing Sheets

(56) References Cited

U.S. PATENT DOCUMENTS

| | | | | |
|---|---|---|---|---|
| 2019/0141592 | A1 | 5/2019 | Park et al. | |
| 2020/0077445 | A1 | 3/2020 | Tang et al. | |
| 2021/0092617 | A1* | 3/2021 | Veeramallu | H04W 4/70 |
| 2023/0300739 | A1* | 9/2023 | Nuggehalli | H04W 48/20<br>455/434 |
| 2024/0389134 | A1* | 11/2024 | Li | H04W 74/004 |

FOREIGN PATENT DOCUMENTS

| | | | |
|---|---|---|---|
| EP | 3905752 | A1 | 11/2021 |
| KR | 10-1636258 | B1 | 7/2016 |

OTHER PUBLICATIONS

International Search Report and Written Opinion of the International Searching Authority dated Feb. 23, 2023, in connection with International Application No. PCT/KR2022/018109, 9 pages.

Office Action dated Aug. 25, 2023, in connection with Indian Patent Application 202141052478, 5 pages.

* cited by examiner

[Fig. 1]
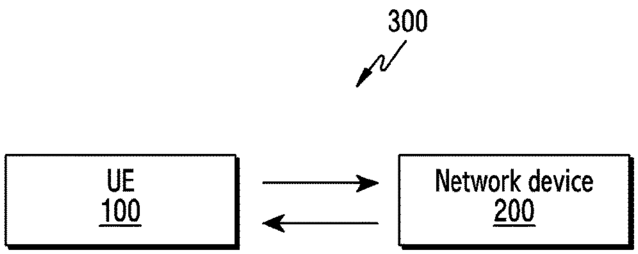
[Fig. 2]
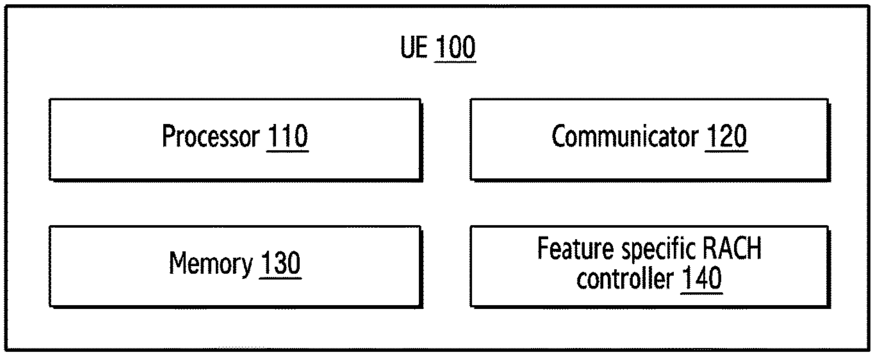
[Fig. 3]
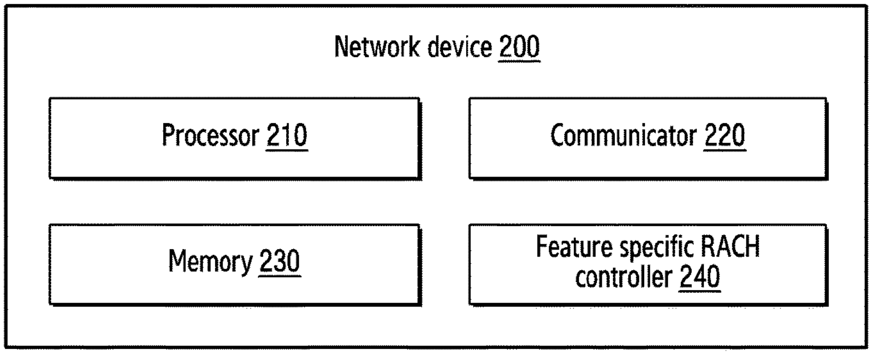
[Fig. 4]
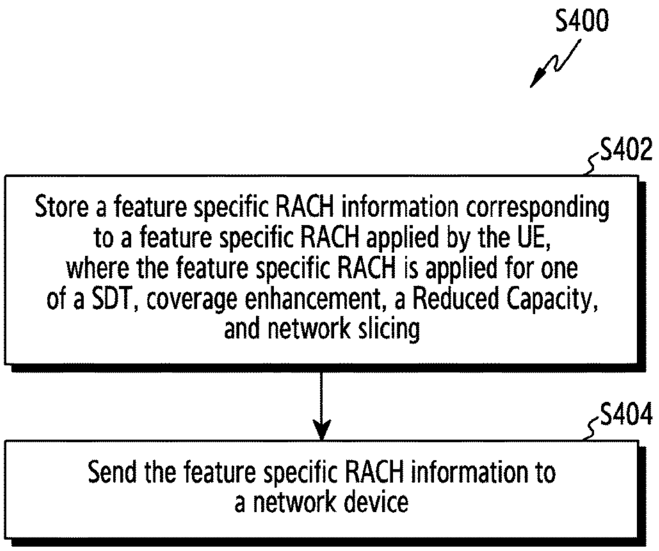

[Fig. 5]
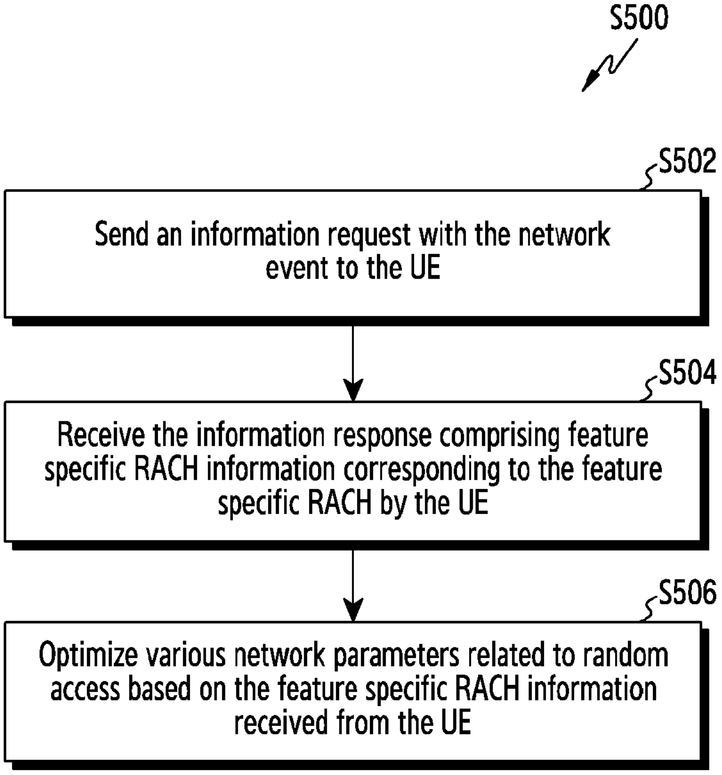

[Fig. 6]
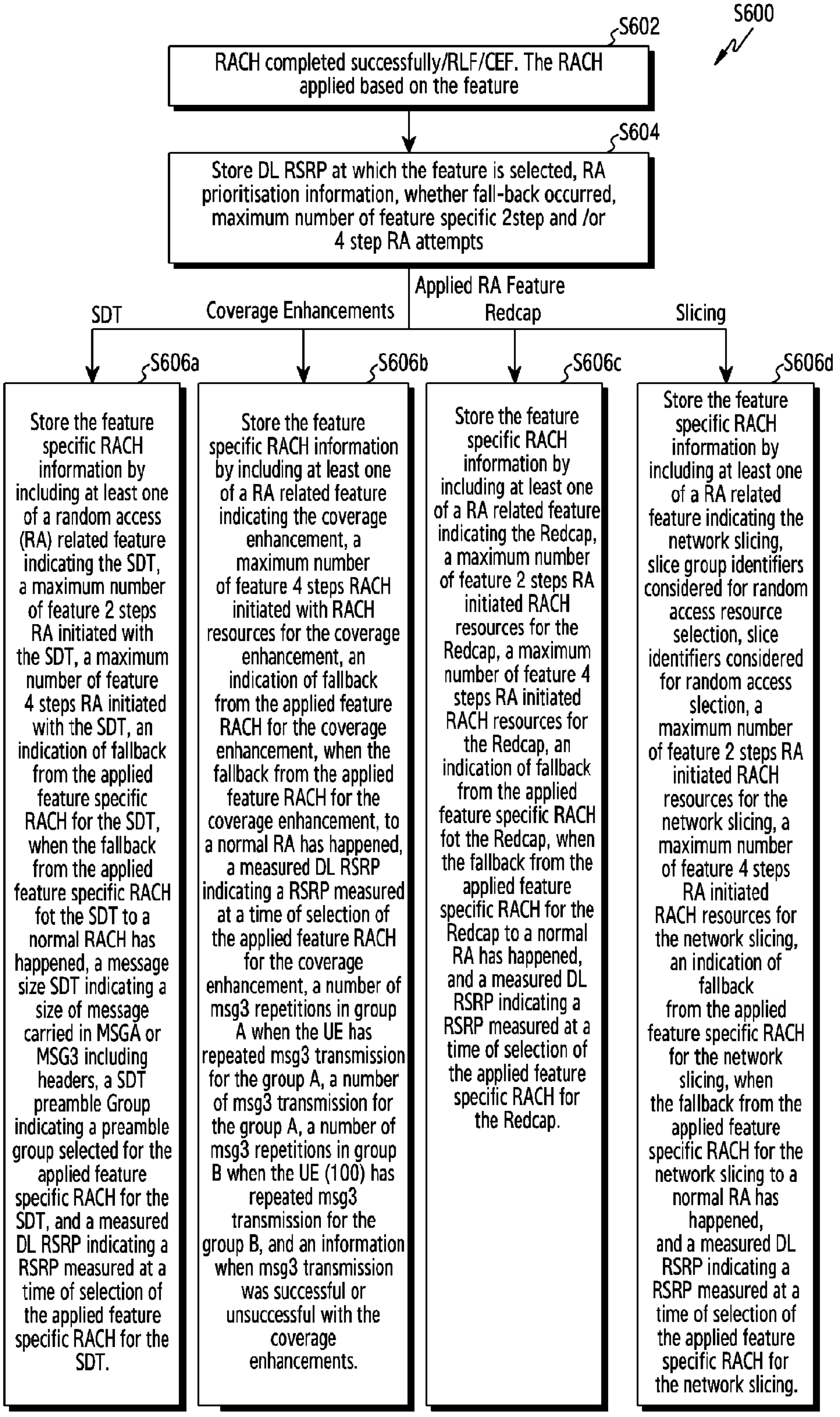

[Fig. 7]
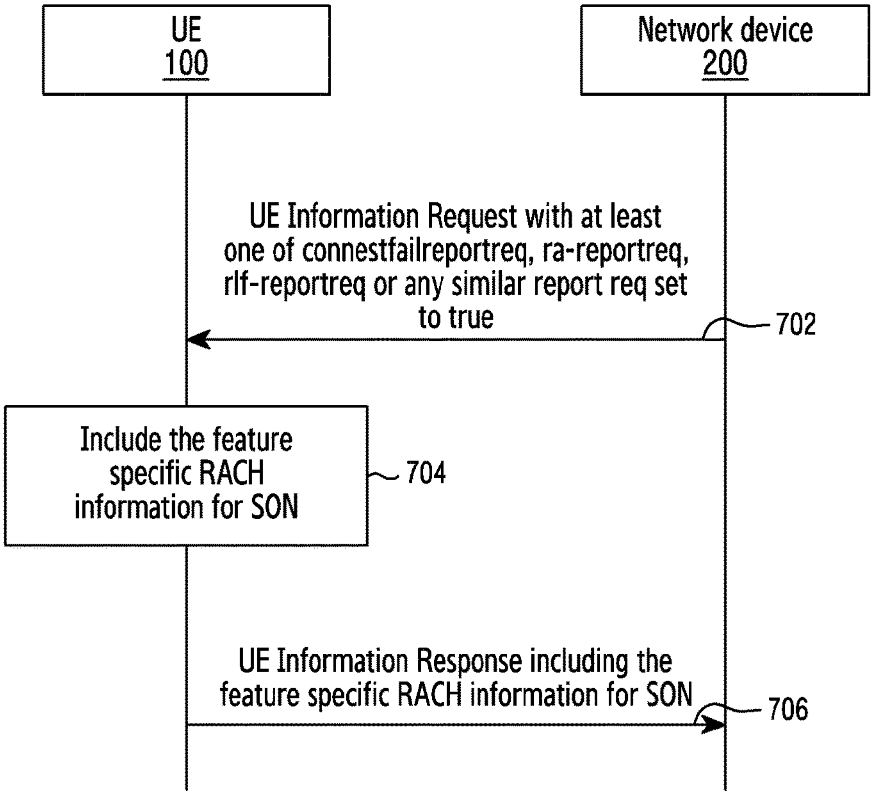
[Fig. 8]
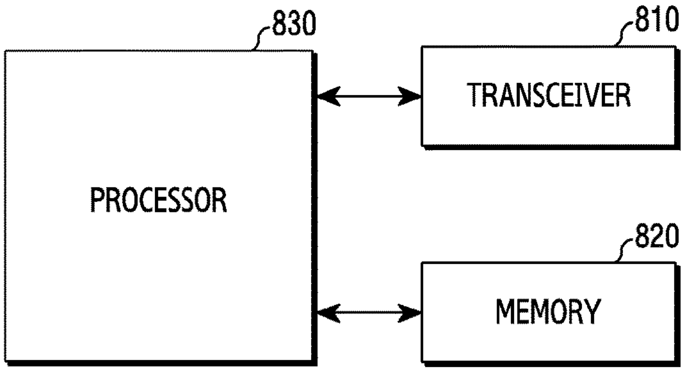
[Fig. 9]
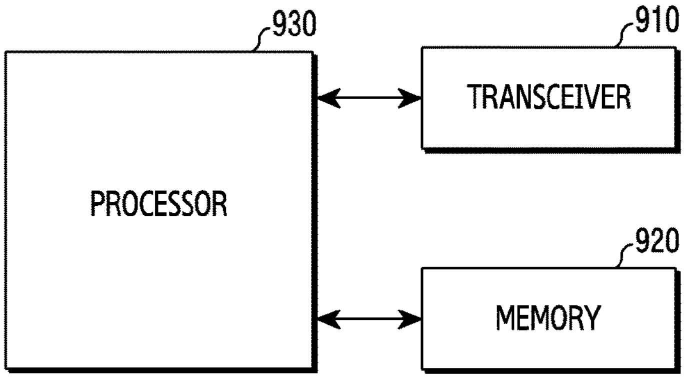

METHOD AND SYSTEM FOR SELF OPTIMIZATION OF RANDOM ACCESS CHANNEL IN WIRELESS COMMUNICATION SYSTEM

TECHNICAL FIELD

The present disclosure relates to a wireless communication network, and more particularly to methods and systems for self-optimization of random access channel. This application is based on and derives the benefit of Indian Provisional Application 202141052478 filed on Nov. 16, 2021, and the Indian Complete Application 202141052478 filed on Nov. 6, 2022, contents of which are incorporated herein by reference.

BACKGROUND ART 5G mobile communication technologies define broad frequency bands such that high transmission rates and new services are possible, and can be implemented not only in “Sub 6 GHz” bands such as 3.5 GHz, but also in “Above 6 GHz” bands referred to as mmWave including 28 GHz and 39 GHz. In addition, it has been considered to implement 6G mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

DISCLOSURE OF INVENTION

Technical Problem

The present disclosure relates to wireless communication systems and, more specifically, the present disclosure relates to a method and systems for self-optimization of random access channel in a wireless communication system.

Solution to Problem

The embodiment herein is to provide a method and system for self-optimization of random access channel (RACH) in a wireless network. The method includes storing, by a User Equipment (UE), a feature specific RACH information corresponding to a feature specific RACH applied by the UE. The feature specific RACH is applied for one of a Small Data Transmission (SDT), coverage enhancement, a Reduced Capacity (Redcap), and network slicing upon detecting the UE selects a random access resource configured for feature specific RACH while performing random access procedure. Further, the method includes sending, by the UE, the feature specific RACH information to a network device in the wireless network.

In an embodiment, the UE stores the feature specific random access information during at least one of receiving a RRC message UE information Request, a successful completion of a RACH procedure, detection of a radio link failure (RLF), detection of a connection establishment failure during a RRC procedure, detection of a connection establishment failure due to expiry of a timer, and detection of a connection establishment failure (CEF).

In an embodiment, the UE sends the feature specific random access information inside a RA-information common within a RLF Report, a CEF repot or a RA-Report within a RRC message such as a UE information response. The UE information response is sent on receiving RRC messages such as UE information request.

In an embodiment, sending, by the UE, the feature specific RACH information to the network device includes detecting, by the UE, that the feature specific RACH information applied by the UE is for the SDT, and sending, by the UE, the feature specific RACH information by including at least one of: a RA related feature indicating the SDT, a maximum number of feature 2 steps RA initiated with the SDT, a maximum number of feature 4 steps RA initiated with the SDT, an indication of fallback from the applied feature specific RACH for the SDT, when the fallback from the applied feature specific RACH for the SDT to a normal RACH has happened, a Message Size SDT indicating a size of message carried in MSGA or MSG3 including headers, a SDT preamble Group indicating a preamble group selected for the applied feature specific RACH for the SDT, and a measured DL RSRP indicating a RSRP measured at a time of selection of the applied feature specific RACH for the SDT.

In another embodiment, sending, by the UE, the feature specific RACH information to the network device includes detecting, by the UE, that the feature specific RACH information applied by the UE is for the coverage enhancement, and sending, by the UE, the feature specific RACH information by including at least one of: a RA related feature indicating the coverage enhancement, a maximum number of feature 4 steps RACH initiated with RACH resources for the coverage enhancement, an indication of fallback from the applied feature RACH for the coverage enhancement, when the fallback from the applied feature RACH for the coverage enhancement to a normal RA has happened, a measured DL RSRP indicating a RSRP measured at a time of selection of the applied feature RACH for the coverage enhancement, a number of msg3 repetitions in group A when the UE has repeated msg3 transmission for the group A, a number of msg3 repetitions in group B when the UE has repeated msg3 transmission for the group B and an information whether msg3 transmission was successful or unsuccessful with the coverage enhancements. In an example, if the UE is configured by the network to repeat 3 transmissions for the group A or the group B, for e.g. through layer1 control signalling and if it was not successful in sending 3 and has send only 2, for e.g. due to HARQ errors, UE logs 2 as the number of msg3 repetitions for the respective group.

In another embodiment, sending, by the UE, the feature specific RACH information to the network device includes detecting, by the UE, that the feature specific RACH information applied by the UE is for the Redcap, and sending, by the UE, the feature specific RACH information by including at least one of a RA related feature indicating the Redcap, a maximum number of feature 2 steps RA initiated RACH resources for the Redcap, a maximum number of feature 4 steps RA initiated RACH resources for the Redcap, an indication of fallback from the applied feature specific RACH for the Redcap, when the fallback from the applied feature specific RACH for the Redcap to a normal RA has happened, and a measured DL RSRP indicating a RSRP measured at a time of selection of the applied feature specific RACH for the Redcap.

In another embodiment, sending, by the UE, the feature specific RACH information to the network device includes detecting, by the UE, that the feature specific RACH information applied by the UE is for the network slicing, and sending, by the UE, the feature specific RACH information by including at least one of: a RA related feature indicating the network slicing, slice group identifiers considered for random access resource selection, slice identifiers considered for random access selection, a maximum number of feature 2 steps RA initiated RACH resources for the network slicing, a maximum number of feature 4 steps RA initiated RACH resources for the network slicing, an indication of fallback from the applied feature specific RACH for the network slicing, when the fallback from the applied feature specific RACH for the network slicing to a normal RA has happened, and a measured DL RSRP indicating a RSRP measured at a time of selection of the applied feature specific RACH for the network slicing.

In an embodiment, the method includes applying, by the UE, whether the feature specific RACH in the wireless network for one of the SDT, the coverage enhancement, the Reduced Capacity (Redcap), and the network slicing; and storing, by the UE, the feature specific RACH information comprising at least one of a RA related feature indicating the applied feature specific RACH, a maximum number of feature 2 steps RA initiated RACH resources for the applied feature specific RACH, a maximum number of feature 4 steps RA initiated RACH resources for the applied feature specific RACH, an indication of fallback from the applied feature specific RACH, when the fallback from the applied feature specific RACH to a normal RA has happened, a measured DL RSRP indicating a RSRP measured at a time of selection of the applied feature specific RACH, a number of msg3 repetitions in group A when the UE has repeated msg3 transmission for the group A, A number of msg3 repetitions in group B when the UE has repeated msg3 transmission for the group B, an information whether msg3 transmission was successful or unsuccessful with the coverage enhancements, a message size SDT indicating a size of message carried in MSGA or MSG3 including headers, a preamble Group indicating a preamble group selected for the applied feature specific RACH, slice group identifiers applied for random access resource selection, and slice identifiers applied for random access resource selection.

Accordingly, the embodiment herein is to provide a method for self-optimization of random access channel (RACH) in a wireless network. The method includes sending, by a network device in the wireless network, an information request with a network event to a UE in the wireless network. Further, the method includes receiving, by the network device, an information response comprising feature specific RACH information corresponding to a feature specific RACH by the UE. The feature specific RACH is applied for one of a Small Data Transmission (SDT), coverage enhancement, a Reduced Capacity (Redcap), and network slicing. Further, the method includes optimizing, by the network device, various network parameters related to random access based on the feature specific RACH information received from the UE.

In an embodiment, the various network parameters related to random access is optimized by sending, by a centralized unit (CU) of the network device, the applied feature specific RACH information received from the UE to a Distributed unit (DU) of the network device, sending, the CU of the network device, the applied feature specific RACH information received from the UE to a SON controller of the network device, and optimizing, by SON controller of the network device, the various network parameters related to random access based on the applied feature specific RACH information.

In an embodiment, the feature specific RACH is applied for the SDT, wherein the feature specific RACH includes at least one of a RA related feature indicating the SDT, a maximum number of feature 2 steps RA initiated with the SDT, a maximum number of feature 4 steps RA initiated with the SDT, an indication of fallback from the applied feature specific RACH for the SDT, when the fallback from the applied feature specific RACH for the SDT to a normal RACH has happened, a Message Size SDT indicating a size of message carried in MSGA or MSG3 including headers, a SDT preamble Group indicating a preamble group selected for the applied feature specific RACH for the SDT, and a measured DL RSRP indicating a RSRP measured at a time of selection of the applied feature specific RACH for the SDT.

In an embodiment, the feature specific RACH is applied for the coverage enhancement, the feature specific RACH comprises at least one of a RA related feature indicating the coverage enhancement, a maximum number of feature 4 steps RACH initiated with RACH resources for the coverage enhancement, an indication of fallback from the applied feature RACH for the coverage enhancement, when the fallback from the applied feature RACH for the coverage enhancement to a normal RA has happened, a measured DL RSRP indicating a RSRP measured at a time of selection of the applied feature RACH for the coverage enhancement, A number of msg3 repetitions in group A when the UE has repeated msg3 transmission for the group A, A number of msg3 repetitions in group B when the UE has repeated msg3 transmission for the group B, and an information whether msg3 transmission was successful or unsuccessful with the coverage enhancements.

In an embodiment, the feature specific RACH is applied for the Redcap, the feature specific RACH includes at least one of a RA related feature indicating the Redcap, a maximum number of feature 2 steps RA initiated RACH resources for the Redcap, a maximum number of feature 4 steps RA initiated RACH resources for the Redcap, an indication of fallback from the applied feature specific RACH for the Redcap, when the fallback from the applied feature specific RACH for the Redcap to a normal RA has happened, and a measured DL RSRP indicating a RSRP measured at a time of selection of the applied feature specific RACH for the Redcap.

In an embodiment, the feature specific RACH is applied for the network slicing, wherein the feature specific RACH includes at least one of a RA related feature indicating the network slicing, a maximum number of feature 2 steps RA initiated RACH resources for the network slicing, a maximum number of feature 4 steps RA initiated RACH resources for the network slicing, slice group identifiers applied for random access resource selection, slice identifiers applied for random access selection, an indication of fallback from the applied feature specific RACH for the network slicing, when the fallback from the applied feature specific RACH for the network slicing to a normal RA has happened, and a measured DL RSRP indicating a RSRP measured at a time of selection of the applied feature specific RACH for the network slicing.

Accordingly, the embodiment herein is to provide a UE for self-optimization of random access channel (RACH) in a wireless network. The UE includes a feature specific RACH controller communicatively coupled to a memory and a processor. The feature specific RACH controller is configured to store a feature specific RACH information corresponding to a feature specific RACH applied by the UE. The feature specific RACH is applied for one of a Small Data Transmission (SDT), coverage enhancement, a Reduced Capacity (Redcap), and network slicing. Further, the feature specific RACH controller is configured to send the feature specific RACH information to a network device in the wireless network.

Accordingly, the embodiment herein is to provide a network device for self-optimization of random access channel (RACH) in a wireless network. The network device includes a feature specific RACH controller communicatively coupled to a memory and a processor. The feature specific RACH controller sends an information request with a network event to a UE in the wireless network. Further, the feature specific RACH controller receives an information response comprising feature specific RACH information corresponding to a feature specific RACH by the UE. The feature specific RACH is applied for one of a Small Data Transmission (SDT), coverage enhancement, a Reduced Capacity (Redcap), and network slicing. Further, the feature specific RACH controller optimizes various network parameters related to random access based on the feature specific RACH information received from the UE.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

Advantageous Effects of Invention

Aspects of the present disclosure provide efficient communication methods in a wireless communication system.

BRIEF DESCRIPTION OF DRAWINGS

This disclosure is illustrated in the accompanying drawings, throughout which like reference letters indicate corresponding parts in the various figures.

FIG. 1 illustrates a wireless network for self-optimization of random access channel (RACH), according to the embodiments as disclosed herein;

FIG. 2 illustrates various hardware components of a UE, according to the embodiments as disclosed herein;

FIG. 3 illustrates various hardware components of a network device, according to the embodiments as disclosed herein;

FIG. 4 is a flow chart illustrating a method, implemented by the UE, for self-optimization of the RACH in the wireless network, according to the embodiments as disclosed herein;

FIG. 5 is a flow chart illustrating a method, implemented by the network device, for self-optimization of the RACH in the wireless network, according to the embodiments as disclosed herein;

FIG. 6 illustrates an example flow chart scenario of storing feature specific RACH information in the UE, according to the embodiments as disclosed herein;

FIG. 7 illustrates an example sequence diagram scenario of reporting feature specific RACH information to a network device (e.g., gNB or the like), according to the embodiments as disclosed herein.

FIG. 8 is a block diagram illustrating a structure of a UE according to an embodiment of the disclosure; and FIG. 9 is a block diagram illustrating a structure of a base station according to an embodiment of the disclosure.

BEST MODE FOR CARRYING OUT THE INVENTION

Accordingly, the embodiment herein is to provide a method for self-optimization of random access channel (RACH) in a wireless network (300). The method includes storing, by a User Equipment (UE) (100), a feature specific RACH information corresponding to a feature specific RACH applied by the UE (100) upon determining that the UE (100) selects a random access resource configured for the feature specific RACH while performing a random access (RA) procedure, wherein the feature specific RACH is applied for one or more of a Small Data Transmission (SDT), coverage enhancement, a Reduced Capacity (Redcap), and network slicing. Further, the method includes sending, by the UE (100), the feature specific RACH information to a network device (200) in the wireless network (300).

In an embodiment, the UE stores the feature specific random access information during at least one of receiving a radio resource control (RRC) message, a UE information request, a successful completion of a RACH procedure, detection of a radio link failure (RLF), detection of a connection establishment failure during a RRC procedure, detection of a connection establishment failure due to expiry of a timer, and detection of a connection establishment failure (CEF).

In an embodiment, the UE (100) sends the feature specific random access information inside a RA-information Common within a RLF report, a CEF repot or a RA-Report within a RRC message UE information response, wherein the RRC message UE information response is sent upon receiving a RRC message wherein the RRC message comprises a UE information request.

In an embodiment, the feature specific RACH information to the network device (200) includes detecting, by the UE (100), that the feature specific RACH information applied by the UE (100) is for the SDT. Further, the feature specific RACH information to the network device (200) includes sending, by the UE (100), the feature specific RACH information by including at least one of: a random access (RA) related feature indicating the SDT, a maximum number of feature 2 steps RA initiated with the SDT, a maximum number of feature 4 steps RA initiated with the SDT, an indication of fallback from the applied feature specific RACH for the SDT, when the fallback from the applied feature specific RACH for the SDT to a normal RACH has happened, a Message Size SDT indicating a size of message carried in MSGA or MSG3 including headers, a SDT preamble Group indicating a preamble group selected for the applied feature specific RACH for the SDT, and a measured DL RSRP indicating a RSRP measured at a time of selection of the applied feature specific RACH for the SDT.

In an embodiment, the feature specific RACH information to the network device (200) includes detecting, by the UE (100), that the feature specific RACH information applied by the UE (100) is for the coverage enhancement. Further the method includes sending, by the UE (100), the feature specific RACH information by including at least one of: a RA related feature indicating the coverage enhancement, a maximum number of feature 4 steps RACH initiated with RACH resources for the coverage enhancement, an indication of fallback from the applied feature RACH for the coverage enhancement, when the fallback from the applied feature RACH for the coverage enhancement to a normal RA has happened, a measured down link (DL) Reference Signal Received Power (RSRP) indicating a RSRP measured at a time of selection of the applied feature RACH for the coverage enhancement, a number of msg3 repetitions in group A when the UE (100) has repeated msg3 transmission for the group A, a number of msg3 repetitions in group B when the UE (100) has repeated msg3 transmission for the group B, and an information whether msg3 transmission was successful or unsuccessful with the coverage enhancements.

In an embodiment, the feature specific RACH information to the network device (200) includes detecting, by the UE (100), that the feature specific RACH information applied by the UE (100) is for the Redcap. further, feature specific RACH information to the network device (200) includes sending, by the UE (100), the feature specific RACH information by including at least one of: a RA related feature indicating the Redcap, a maximum number of feature 2 steps RA initiated RACH resources for the Redcap, a maximum number of feature 4 steps RA initiated RACH resources for the Redcap, an indication of fallback from the applied feature specific RACH for the Redcap, when the fallback from the applied feature specific RACH for the Redcap to a normal RA has happened, and a measured DL RSRP indicating a RSRP measured at a time of selection of the applied feature specific RACH for the Redcap.

In an embodiment, the feature specific RACH information to the network device (200) includes detecting, by the UE (100), that the feature specific RACH information applied by the UE (100) is for the network slicing. Further, the feature specific RACH information to the network device (200) includes sending, by the UE (100), the feature specific RACH information by including at least one of: a RA related feature indicating the network slicing, slice group identifiers applied for random access resource selection, slice identifiers applied for random access resource selection, a maximum number of feature 2 steps RA initiated RACH resources for the network slicing, a maximum number of feature 4 steps RA initiated RACH resources for the network slicing, an indication of fallback from the applied feature specific RACH for the network slicing, when the fallback from the applied feature specific RACH for the network slicing to a normal RA has happened, and a measured DL RSRP indicating a RSRP measured at a time of selection of the applied feature specific RACH for the network slicing.

In an embodiment, the method includes applying, by the UE (100), whether the feature specific RACH in the wireless network (300) for one or more of the SDT, the coverage enhancement, the Reduced Capacity (Redcap), and the network slicing. Further, the method includes storing, by the UE (100), the feature specific RACH information comprising at least one of: a RA related feature indicating the applied feature specific RACH, a maximum number of feature 2 steps RA initiated RACH resources for the applied feature specific RACH, a maximum number of feature 4 steps RA initiated RACH resources for the applied feature specific RACH, an indication of fallback from the applied feature specific RACH, when the fallback from the applied feature specific RACH to a normal RA has happened, a measured DL RSRP indicating a RSRP measured at a time of selection of the applied feature specific RACH, a number of msg3 repetitions in group A when the UE (100) has repeated msg3 transmission for the group A, a number of msg3 repetitions in group B when the UE (100) has repeated msg3 transmission for the group B, an information whether msg3 transmission was successful or unsuccessful with the coverage enhancements, a Message Size SDT indicating a size of message carried in MSGA or MSG3 including headers, a preamble Group indicating a preamble group selected for the applied feature specific RACH, slice group identifiers applied for random access resource selection, and slice identifiers applied for random access resource selection.

Accordingly, the embodiment herein is to provide a method for self-optimization of random access channel (RACH) in a wireless network (300). The method includes sending, by a network device (200) in the wireless network (300), an information request with a network event to a User Equipment (UE) (100) in the wireless network (300). Further, the method includes receiving, by the network device (200), an information response comprising feature specific RACH information corresponding to a feature specific RACH by the UE (100), wherein the feature specific RACH is applied for one of a Small Data Transmission (SDT), coverage enhancement, a Reduced Capacity (Redcap), and network slicing. Further, the method includes optimizing, by the network device (200), various network parameters related to random access (RA) based on the feature specific RACH information received from the UE (100).

In an embodiment, the various network parameters related to the random access (RA) based on the applied feature specific RACH information received from the UE (100) includes sending, by a centralized unit (CU) of the network device (200), the applied feature specific RACH information received from the UE (100) to a Distributed unit (DU) of the network device (200). Further, the various network parameters related to the random access (RA) based on the applied feature specific RACH information received from the UE (100) includes sending, the CU of the network device (200), the applied feature specific RACH information received from the UE (100) to a SON controller of the network device (200). Further, the various network parameters related to the random access (RA) based on the applied feature specific RACH information received from the UE (100) includes optimizing, by the SON controller of the network device (200), the various network parameters related to random access based on the applied feature specific RACH information.

In an embodiment, the applied feature specific RACH comprises at least one of: a RA related feature indicating the SDT, a maximum number of feature 2 steps RA initiated with the SDT, a maximum number of feature 4 steps RA initiated with the SDT, an indication of fallback from the applied feature specific RACH for the SDT, when the fallback from the applied feature specific RACH for the SDT to a normal RACH has happened, a Message Size SDT indicating a size of message carried in MSGA or MSG3 including headers, a SDT preamble Group indicating a preamble group selected for the applied feature specific RACH for the SDT, and a measured DL RSRP indicating a RSRP measured at a time of selection of the applied feature specific RACH for the SDT.

In an embodiment, the applied feature specific RACH comprises at least one of: a RA related feature indicating the coverage enhancement, a maximum number of feature 4 steps RACH initiated with RACH resources for the coverage enhancement, an indication of fallback from the applied feature RACH for the coverage enhancement, when the fallback from the applied feature RACH for the coverage enhancement to a normal RA has happened, a measured DL RSRP indicating a RSRP measured at a time of selection of the applied feature RACH for the coverage enhancement, a number of msg3 repetitions in group A when the UE (100) has repeated msg3 transmission for the group A, a number of msg3 repetitions in group B when the UE (100) has repeated msg3 transmission for the group B, and an information whether msg3 transmission was successful or unsuccessful with the coverage enhancements.

In an embodiment, the applied feature specific RACH comprises at least one of: a RA related feature indicating the Redcap, a maximum number of feature 2 steps RA initiated RACH resources for the Redcap, a maximum number of feature 4 steps RA initiated RACH resources for the Redcap, an indication of fallback from the applied feature specific RACH for the Redcap, when the fallback from the applied feature specific RACH for the Redcap to a normal RA has happened, and a measured DL RSRP indicating a RSRP measured at a time of selection of the applied feature specific RACH for the Redcap.

In an embodiment, send the feature specific RACH information to the network device (200) includes detect that the feature specific RACH information applied by the UE (100) is for the coverage enhancement. Further, send the feature specific RACH information to the network device (200) includes store the feature specific RACH information by including at least one of: a RA related feature indicating the coverage enhancement, a maximum number of feature 4 steps RACH initiated with RACH resources for the coverage enhancement, an indication of fallback from the applied feature RACH for the coverage enhancement, when the fallback from the applied feature RACH for the coverage enhancement to a normal RA has happened, a measured down link (DL) Reference Signal Received Power (RSRP) indicating a RSRP measured at a time of selection of the applied feature RACH for the coverage enhancement, a number of msg3 repetitions in group A when the UE (100) has repeated msg3 transmission for the group A, a number of msg3 repetitions in group B when the UE (100) has repeated msg3 transmission for the group B, and an information whether msg3 transmission was successful or unsuccessful with the coverage enhancements.

In an embodiment, the applied feature specific RACH comprises at least one of: a RA related feature indicating the network slicing, a maximum number of feature 2 steps RA initiated RACH resources for the network slicing, a maximum number of feature 4 steps RA initiated RACH resources for the network slicing, slice group identifiers applied for random access resource selection, slice identifiers applied for random access selection, an indication of fallback from the applied feature specific RACH for the network slicing, when the fallback from the applied feature specific RACH for the network slicing to a normal RA has happened, and a measured DL RSRP indicating a RSRP measured at a time of selection of the applied feature specific RACH for the network slicing.

In an embodiment, send the feature specific RACH information to the network device (200) includes detect that the feature specific RACH information applied by the UE (100) is for the network slicing. Further, send the feature specific RACH information to the network device (200) includes store the feature specific RACH information by including at least one of: a RA related feature indicating the network slicing, slice group identifiers applied for random access resource selection, slice identifiers applied for random access selection, a maximum number of feature 2 steps RA initiated RACH resources for the network slicing, a maximum number of feature 4 steps RA initiated RACH resources for the network slicing, an indication of fallback from the applied feature specific RACH for the network slicing, when the fallback from the applied feature specific RACH for the network slicing to a normal RA has happened, and a measured DL RSRP indicating a RSRP measured at a time of selection of the applied feature specific RACH for the network slicing.

In an embodiment, the feature specific RACH controller (140) is configured to apply whether the feature specific RACH in the wireless network (300) for one of the SDT, the coverage enhancement, the Reduced Capacity (Redcap), and the network slicing. Further, the feature specific RACH controller (140) is configured to store the feature specific RACH information comprising at least one of: a RA related feature indicating the applied feature specific RACH, a maximum number of feature 2 steps RA initiated RACH resources for the applied feature specific RACH, a maximum number of feature 4 steps RA initiated RACH resources for the applied feature specific RACH, an indication of fallback from the applied feature specific RACH, when the fallback from the applied feature specific RACH to a normal RA has happened, a measured DL RSRP indicating a RSRP measured at a time of selection of the applied feature specific RACH, a number of msg3 repetitions in group A when the UE (100) has repeated msg3 transmission for the group A, a number of msg3 repetitions in group B when the UE (100) has repeated msg3 transmission for the group B, An information whether msg3 transmission was successful or unsuccessful with the applied feature specific RACH, a Message Size SDT indicating a size of message carried in MSGA or MSG3 including headers, a preamble Group indicating a preamble group selected for the applied feature specific RACH, slice group identifiers applied for random access resource selection, and, slice identifiers applied for random access selection.

Accordingly, the embodiment herein is to provide a network device (200) for self-optimization of random access channel (RACH) in a wireless network (300). The network device (200) includes a memory (230), a processor (210), and a feature specific RACH controller (240), communicatively coupled to the memory (230) and the processor (210). The processor configured to send an information request with a network event to a UE (100) in the wireless network (300). Further, the processor configured to receive information response comprising feature specific RACH information corresponding to a feature specific RACH by the UE (100), wherein the feature specific RACH is applied for one of a Small Data Transmission (SDT), coverage enhancement, a Reduced Capacity (Redcap), and network slicing. Further, the processor configured to optimize various network parameters related to random access (RA) based on the feature specific RACH information received from the UE (100).

In an embodiment, the processor configured to send the applied feature specific RACH information received from the UE (100) to a Distributed unit (DU) of the network device (200) using a centralized unit (CU) of the network device (200). Further, the processor configured to send the applied feature specific RACH information received from the UE (100) to a SON controller of the network device (200) using the CU of the network device (200). Further, the processor configured to optimize the various network parameters related to random access based on the applied feature specific using the SON controller of the network device (200).

In an embodiment, the applied feature specific RACH comprises at least one of: a RA related feature indicating the SDT, a maximum number of feature 2 steps RA initiated with the SDT, a maximum number of feature 4 steps RA initiated with the SDT, an indication of fallback from the applied feature specific RACH for the SDT, when the fallback from the applied feature specific RACH for the SDT to a normal RACH has happened, a Message Size SDT indicating a size of message carried in MSGA or MSG3 including headers, a SDT preamble Group indicating a preamble group selected for the applied feature specific RACH for the SDT, and a measured DL RSRP indicating a RSRP measured at a time of selection of the applied feature specific RACH for the SDT.

In an embodiment, the applied feature specific RACH comprises at least one of: a RA related feature indicating the coverage enhancement, a maximum number of feature 4 steps RACH initiated with RACH resources for the coverage enhancement, an indication of fallback from the applied feature RACH for the coverage enhancement, when the fallback from the applied feature RACH for the coverage enhancement to a normal RA has happened, a measured DL RSRP indicating a RSRP measured at a time of selection of the applied feature RACH for the coverage enhancement, a number of msg3 repetitions in group A when the UE (100) has repeated msg3 transmission for the group A, a number of msg3 repetitions in group B when the UE (100) has repeated msg3 transmission for the group B, and an information whether msg3 transmission was successful or unsuccessful with the coverage enhancements.

In an embodiment, the applied feature specific RACH comprises at least one of: a RA related feature indicating the Redcap, a maximum number of feature 2 steps RA initiated RACH resources for the Redcap, a maximum number of feature 4 steps RA initiated RACH resources for the Redcap, an indication of fallback from the applied feature specific RACH for the Redcap, when the fallback from the applied feature specific RACH for the Redcap to a normal RA has happened, and a measured DL RSRP indicating a RSRP measured at a time of selection of the applied feature specific RACH for the Redcap.

In an embodiment, the applied feature specific RACH comprises at least one of: a RA related feature indicating the network slicing, a maximum number of feature 2 steps RA initiated RACH resources for the network slicing, a maximum number of feature 4 steps RA initiated RACH resources for the network slicing, an indication of fallback from the applied feature specific RACH for the network slicing, when the fallback from the applied feature specific RACH for the network slicing to a normal RA has happened, a measured DL RSRP indicating a RSRP measured at a time of selection of the applied feature specific RACH for the network slicing, slice group identifiers applied for random access resource selection, and slice identifiers applied for random access selection.

MODE FOR THE INVENTION

In 5th Generation (5G) wireless communication system, a random access (RA) is supported. The RA is used to achieve uplink (UL) time synchronization. The RA is used during initial access, handover, radio resource control (RRC) connection re-establishment procedure, scheduling request transmission, secondary cell group (SCG) addition/modification, beam failure recovery, data or control information transmission in the UL by non-synchronized UE in a radio resource control (RRC) CONNECTED state etc. Several types of random access procedure are supported.

Contention Based Random Access (CBRA)—In this type of random access, a UE first transmits Random Access preamble (also referred as Msg1) and then waits for Random access response (RAR) in a RAR window. The RAR is also referred as Msg2. Next generation node B (gNB) transmits the RAR on a physical downlink shared channel (PDSCH). PDCCH (physical downlink control channel) scheduling the PDSCH carrying RAR is addressed to RA-radio network temporary identifier (RA-RNTI). A RA-RNTI identifies the time-frequency resource (also referred as physical RA channel (PRACH) occasion or PRACH transmission (TX) occasion or RA channel (RACH) occasion) in which RA preamble was detected by gNB. If the RAR corresponding to its RA preamble transmission is received, the UE transmits message 3 (Msg3) in UL grant received in RAR. The Msg3 includes message such as RRC connection request, RRC connection re-establishment request, RRC handover confirm, scheduling request, SI request etc. It may include the UE identity (i.e. cell-radio network temporary identifier (C-RNTI) or system architecture evolution (SAE)-temporary mobile subscriber identity (S-TMSI) or a random number). After transmitting the Msg3, the UE starts a contention resolution timer. While the contention resolution timer is running, if the UE receives a physical downlink control channel (PDCCH) addressed to the C-RNTI included in the Msg3, contention resolution is considered successful, the contention resolution timer is stopped and the RA procedure is completed. While the contention resolution timer is running, if the UE receives contention resolution MAC control element (CE) including the UE's contention resolution identity (first X bits of common control channel (CCCH) service data unit (SDU) transmitted in Msg3), contention resolution is considered successful, the contention resolution timer is stopped and the RA procedure is completed. If the contention resolution timer expires and the UE has not yet transmitted the RA preamble for a configurable number of times, the UE goes back to first step i.e. select random access resource (preamble/RACH occasion) and transmits the RA preamble. A backoff may be applied before going back to first step.

Contention Free Random Access (CFRA)—This is also referred as legacy CFRA or 4 step CFRA. The CFRA procedure is used for scenarios such as handover where low latency is required, timing advance establishment for secondary cell (Scell), etc. 5G node B (gNB) assigns to a UE dedicated Random access preamble. The UE transmits the dedicated RA preamble. The gNB transmits the RAR on PDSCH addressed to RA-RNTI. The RAR conveys RA preamble identifier and timing alignment information. RAR may also include UL grant. The RAR is transmitted in RAR window similar to contention based RA (CBRA) procedure. The CFRA is considered successfully completed after receiving the RAR including RA preamble identifier (RAPID) of RA preamble transmitted by the UE. In case RA is initiated for beam failure recovery, CFRA is considered successfully completed if PDCCH addressed to C-RNTI is received in search space for beam failure recovery. If the RAR window expires and RA is not successfully completed and the UE has not yet transmitted the RA preamble for a configurable (configured by gNB in RACH configuration) number of times, the UE retransmits the RA preamble.

2 Step Contention Based Random Access (2 Step CBRA)—In the first step, the UE transmits random access preamble on the PRACH and a payload (i.e. MAC PDU) on the PUSCH. The random access preamble and payload transmission is also referred as the MsgA. In the second step, after MsgA transmission, the UE monitors for a response from the network (i.e. gNB) within a configured window. The response is also referred as/MsgB. If CCCH SDU was transmitted in MsgA payload, the UE performs contention resolution using the contention resolution information in MsgB. The contention resolution is successful if the contention resolution identity received in MsgB matches first 48 bits of CCCH SDU transmitted in MsgA. If C-RNTI was transmitted in MsgA payload, the contention resolution is successful if the UE receives PDCCH addressed to the C-RNTI. If contention resolution is successful, random access procedure is considered successfully completed. Instead of contention resolution information corresponding to the transmitted MsgA, the MsgB may include fallback information corresponding to the random access preamble transmitted in MsgA. If the fallback information is received, the UE transmits Msg3 and performs contention resolution using Msg4 as in CBRA procedure. If contention resolution is successful, random access procedure is considered successfully completed. If contention resolution fails upon fallback (i.e. upon transmitting Msg3), the UE retransmits MsgA. If configured window in which UE monitor network response after transmitting MsgA expires and UE has not received MsgB including contention resolution information or fallback information as explained above, UE retransmits MsgA. If the random access procedure is not successfully completed even after transmitting the msgA configurable number of times, UE fallbacks to 4 step RACH procedures i.e. UE only transmits the PRACH preamble.

2 Step Contention Free Random Access (2 Step CFRA)—In this case, the gNB assigns to the UE dedicated Random access preamble (s) and PUSCH resource(s) for MsgA transmission. The RACH Occasions RO(s) to be used for preamble transmission may also be indicated. In the first step, the UE transmits random access preamble on PRACH and a payload on the PUSCH using the contention free random access resources (i.e. dedicated preamble/PUSCH resource/RO). In the second step, after the MsgA transmission, the UE monitors for a response from the network (i.e. gNB) within a configured window. If the UE receives PDCCH addressed to C-RNTI, random access procedure is considered successfully completed. If the UE receives fallback information corresponding to its transmitted preamble, random access procedure is considered successfully completed.

New radio (NR) release 17 further enhances RACH for various features like slicing, SDT (small data transmission), RedCap (reduced capability) UEs, CovEnh (coverage enhancements) etc. A number of preambles from available RACH preambles and a number of RO may be partitioned for various features. The gNB may also allocate different available RACH occasions to different features as indicated in the system information. The gNB may also combine the resources of different features into a feature combination and allocate the same random access resources for them. The feature combination can contain a feature or a combination of features. For slicing, different slices or slice groups may be allocated different RACH resources. For the SDT, there could be separate preamble groups based on the size of data to be transmitted. For coverage enhancements, the UE may be configured to repeat the msg3 and hence coverage enhancements feature may be also known as msg3 repetition feature in NR. For REDCAP, the msg1 resources allocated could be used to identify that the device is a reduced capability device. In addition, for each feature, a number of RACH parameters can be configured separately.

For different features, there may be different criteria which decide whether the UE can select the feature specific RACH resources. In general, the criteria will be broadcasted by the gNB or configured through RRC release message. For the SDT, the criteria may be based on the data volume to be transmitted and the measured RSRP at the time of selection of random access resources. For RedCap, the criteria may be based on the UE capability and the measured RSRP at the time of selection of random access resources. For slicing, the criteria will be based on the slice group (also known as NSAG or Network Slice Access Group in NR) or slice-id (also known as S-NSSAI, Single—Network Slice Selection Assistance Information) that triggers the msg1 transmission. For coverage enhancements, the criteria may be based on the measured RSRP at the time of msg3 repetitions. A number of RACH parameters may be separately configured for feature specific RACH, compared to legacy RACH. For example, SSB selection related parameters, i.e., rsrp-ThresholdSSB, msgA-RSRP-ThresholdSSB or power control related parameters, i.e., preambleReceivedTargetPower/msgA, PreambleReceivedTargetPower, powerRampingStep/msgA-PreamblePowerRampingStep, msg3-DeltaPreambl e/msgA-DeltaPreamble, or preamble group related parameters, i.e., msg3-DeltaPreamble/msgA-DeltaPreamble, messagePowerOffsetGroupB for 2-step RA and 4-step RA, msg3 related parameters likera-Msg3SizeGroupA, message-PowerOffsetGroupB and numberOfRA-PreamblesGroupA when Preamble Group B, msg3 repetitions etc. could be different based on the feature or combination of features used. The RACH may be triggered in the UE based on a feature or a combination of features and the RACH resources may be selected applying/using a different feature or a different combination of features. If the RACH is triggered in the UE based on one or more features or if the UE has applied (used) random access resources configured for one or a combination of features, we may refer it as feature specific RACH. The UE applying random access resources based a feature or a combination of features can also mean that the UE has triggered random access resources based on a feature or a combination of features.

If the feature specific RACH is not successful after certain number of preamble transmissions, the UE may fall back to the legacy 4 step/2 step RACH.

The Self Optimisation in the NR: A 5G NR (new radio) radio access network also known as NG-RAN (Next Generation Radio Network) comprises of a number of NR base stations knows as gNBs. The gNBs can be connected to each other through Xn interface, and will be connected to various core network elements like AMF (Access and Mobility Management Function), UPF (User Plane Function) etc. Further, the gNBs can be divided into two physical entities named CU (Centralized Unit) and DU (Distributed Unit). The CU provides support for the higher layers of the protocol stack such as SDAP (Session Data Application Protocol), PDCP (Packet Data Convergence Protocol) and RRC (Radio Resource Control) while the DU provides support for the lower layers of the protocol stack such as RLC (Radio Link Control), MAC (Medium Access Control) and Physical layer. Each gNB can have multiple cells serving many UEs (User Equipment). There are a large number of algorithms and configuration parameters used in NG-RAN. Especially, it is a very difficult task to identify the most optimal radio parameters and operators used to resort to manual techniques like drive tests to identify the parameters. However, such manual parameter tuning is a costly operation since it depends on a lot of factors like the number of users, number of neighbour cells, maximum throughput requirements in the cell, average throughput requirements in the cell etc. Further, whenever a neighbour gNB is installed or a new service is introduced, many of these manual operations need to be repeated. To resolve this problem, the 3GPP has introduced Self-Organizing Networks (SON) techniques in the wireless technologies like NR. The SON was first introduced in the 3 gpp release 9, in LTE.SON solutions can be divided into three categories: Self-Configuration, Self-Optimization and Self-Healing. The SON architecture can be a centralized, distributed or a hybrid solution.

Self-optimization of RACH aims to minimize the number of attempts on the RACH. The UE can report the detailed information about RACH in the RACH Report to the network and the network will optimize various parameters associated with RACH using the information. A List of information that the UE could report in RACH is given as below based on release 16 version of NR TS 38.331-

```
RA-ReportList-r16                ::=SEQUENCE(SIZE(1..maxRAReport-r16))OF
RA-Report-r16
RA-Report-r16 ::=SEQUENCE {
   cellId-r16                     CHOICE {
      cellGlobalId-r16               CGI-Info-Logging-r16,
      pci-arfcn-r16                SEQUENCE {
         physCellId-r16               PhysCellId,
         carrierFreq-r16              ARFCN-ValueNR
      }
   },
ra-InformationCommon-r16RA-InformationCommon-r16OPTIONAL,
   raPurpose-r16                              ENUMERATED {accessRelated,
beamFailureRecovery, reconfigurationWithSync, ulUnSynchronized,
schedulingRequestFailure,                          noPUCCHResourceAvailable,
requestForOtherSI,
                                      spare9, spare8, spare7, spare6, spare5,
spare4, spare3, spare2, spare1},
   ...
}
RA-InformationCommon-r16 ::=SEQUENCE {
absoluteFrequencyPointA-r16ARFCN-ValueNR,
locationAndBandwidth-r16INTEGER (0..37949),
subcarrierSpacing-r16SubcarrierSpacing,
```

-continued

```
msg1-FrequencyStart-r16INTEGER
(0..maxNrofPhysicalResourceBlocks-1)OPTIONAL,
msg1-FrequencyStartCFRA-r16INTEGER
(0..maxNrofPhysicalResourceBlocks-1)OPTIONAL,
msg1-SubcarrierSpacing-r16SubcarrierSpacingOPTIONAL,
msg1-SubcarrierSpacingCFRA-r16SubcarrierSpacingOPTIONAL,
msg1-FDM-r16ENUMERATED {one, two, four, eight}OPTIONAL,
msg1-FDMCFRA-r16ENUMERATED                    {one, two, four,
eight}OPTIONAL,
perRAInfoList-r16PerRAInfoList-r16,
...,
[[
perRAInfoListExt-v1660PerRAInfoListExt-v1660OPTIONAL
        ]],
    [[
    msgA-FrequencyStart-r17                                INTEGER
(0..maxNrofPhysicalResourceBlocks-1)                 OPTIONAL,
    msgA-FrequencyStartCFRA-r17                            INTEGER
(0..maxNrofPhysicalResourceBlocks-1)                OPTIONAL,
    msgA-SubcarrierSpacing-r17                    SubcarrierSpacingOPTIONAL,
    msgA-SubcarrierSpacingCFRA-r17
SubcarrierSpacingOPTIONAL,
    msgA-FDM-r17                              ENUMERATED {one, two, four,
eight} OPTIONAL,
    msgA-FDMCFRA-r17                          ENUMERATED {one, two, four,
eight} OPTIONAL,
    measuredDL-RSRP-r17                       RSRP-RangeOPTIONAL,
    msgA-TransMax-r17ENUMERATED {n1, n2, n4, n6, n8, n10, n20,
n50, n100, n200}                OPTIONAL
]]}
PerRAInfoList-r16 ::=SEQUENCE(SIZE(1..200))OFPerRAInfo-r16
PerRAInfoListExt-v1660              ::=SEQUENCE (SIZE (1..200)) OF
PerRACSI-RSInfoExt-v1660
PerRAInfo-r16 ::= CHOICE {
perRASSBInfoList-r16PerRASSBInfo-r16,
perRACSI-RSInfoList-r16PerRACSI-RSInfo-r16
}
PerRASSBInfo-r16 ::=SEQUENCE{
ssb-Index-r16SSB-Index,
numberOfPreamblesSentOnSSB-r16INTEGER (1..200),
  perRAAttemptInfoList-r16
}
PerRACSI-RSInfo-r16 ::=SEQUENCE{
csi-RS-Index-r16                    CSI-RS-Index,
numberOfPreamblesSentOnCSI-RS-r16INTEGER (1..200)
}
PerRACSI-RSInfoExt-v1660 ::=SEQUENCE {
  csi-RS-Index-v1660                INTEGER (1..96)          OPTIONAL
}
PerRAAttemptInfoList-r16             ::=SEQUENCE (SIZE (1..200)) OF
PerRAAttemptInfo-r16
PerRAAttemptInfo-r16               ::=SEQUENCE {
  contentionDetected-r16                BOOLEANOPTIONAL,
  dlRSRPAboveThreshold-r16                       BOOLEANOPTIONAL,
  ...,
[[
fallbackRAR-Received-r17BOOLEANOPTIONAL
    ]]
}
```

Release 17 further enhances RACH reporting, for e.g. including the support for optimisation of 2 step RACH.

The UE sends RACH reports to the network in RRC messages, for e.g., UE Information Response. On receiving the RACH report, gNB CU may send it to gNB DU or OAM SON module or may directly use it for optimizing various parameters related to random access. For e.g., the number of preambles, configuration of group A and group B preambles, RACH prioritization information, contention resolution timer, number of RACH preambles for 2 step RACH, PUSCH related parameters for 2 step RACH etc. could be optimised. The existing RA information doesn't consider feature specific RACH. At present, a SON module doesn't have any information about how the UE triggered feature specific RACH and the various parameters or different states or different variables affecting feature specific RACH.

Thus, it is desired to address the above mentioned disadvantages or other shortcomings or at least provide a useful alternative.

The principal object of the embodiments herein is to provide a method and a wireless network for self-optimization of random access channel.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term “or” as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly the embodiment herein is to provide a method for self-optimization of random access channel (RACH) in a wireless network. The method includes storing, by a User Equipment (UE) in the wireless network, a feature specific RACH information corresponding to a feature specific RACH applied by the UE. The feature specific RACH is applied for one of a Small Data Transmission (SDT), coverage enhancement, a Reduced Capacity (Redcap), and network slicing. Further, the method includes sending, by the UE, the feature specific RACH information to a network device in the wireless network for Self-Organizing Networks (SON).

A New Radio (NR) release 17 introduces RACH partitioning for various features—for e.g. both the available preambles and the RACH occasions can be partitioned among various features like slicing, redcap, coverage enhancement, small data transmission etc. This brings in additional challenges for the SON since the partitioning of RACH resources should be done such that each of the feature will get the right amount of resources. When different slices or slice groups can use different RACH resources, suitable partitioning need to be decided. In addition, different features or even different slices/slice groups may need different RACH parameters for the optimal functioning and the SON needs to tune those parameters in a feature specific way.

Referring now to the drawings and more particularly to FIG. 1 through FIG. 7, where similar reference characters denote corresponding features consistently throughout the figures, there are shown preferred embodiments.

FIG. 1 illustrates a wireless network (300) for self-optimization of random access channel (RACH), according to the embodiments as disclosed herein.

In an embodiment, the wireless network (300) includes a UE (100) and a network device (200). The UE (100) can be, for example, but not limited to a cellular phone, a smart phone, a Personal Digital Assistant (PDA), a tablet computer, a laptop computer, an Internet of Things (IoT), embedded systems, edge devices, a vehicle to everything (V2X) device or the like. The network device (200) can also be referred as a base station, a new radio (NR) base station, an eNB, a gNB or the like. the wireless network (300) can be, for example, but not limited to, a fourth generation network, a fifth generation network, an open radio access network (ORAN) network or the like.

The UE (100) receives an information request with a network event from the network device (200). Upon detecting that the UE (100) selects a random access resource configured for the feature specific RACH while performing a random access procedure, the UE (100) stores a feature specific RACH information corresponding to a feature specific RACH applied by the UE (100. The feature specific RACH is applied for one of a Small Data Transmission (SDT), coverage enhancement, a Reduced Capacity (Redcap), and network slicing. Further, the UE (100) sends the feature specific RACH information to the network device (200). The network device (200) receives the information response comprising feature specific RACH information corresponding to the feature specific RACH by the UE (100). Based on the feature specific RACH information received from the UE (100), the network device (200) optimizes various network parameters related to the random access.

In an embodiment, the UE (100) which has initiated random access applying feature specific RACH will send various information for optimizing RACH to the network device (200) (e.g., gNB or the like) as specified below:

1. If the random access was attempted applying feature specific RACH, the UE (100) informs the details of that specific feature to gNB for SON purpose.
   a. Typically, the details will be send using RRC messages like RRC UE Information Response and the information elements like ra-InformationCommon in RA Report, RLF (radio link failure) Report or part of ra-InformationCommon (for e.g., per-RAInfoList) in ConnEstFailReport (connection establishment failure) report, though other messages or IEs (information elements) are not precluded.
2. If the feature, in the embodiment, is the SDT, the UE informs (100) the network device (200) (e.g., gNB or the like) that random access was attempted applying feature specific RACH for the SDT. The UE (100) also informs the network device (200) (e.g., gNB or the like), the identifier of the preamble group used for SDT RACH, the size of the data carried in SDT message and the bearer ids that contain data for the SDT.
   a. Size reported can include the size of data in all bearers excluding the size of RLC/MAC headers when the UE (100) decided to apply SDT RACH. Rather than sending the size directly, the UE (100) may use send a coarse size-range to the network device (200) (e.g., gNB or the like). For e.g., if the size is less than 10 bytes, the UE (100) may send 0, between 10 and 100 bytes UE may send 1, between 100 and 250 UE may send 2 and so on. In an alternate implementation, the UE (100) may just indicate that data volume threshold is exceeded or not for SDT, and this information can be sent even if SDT RACH is not triggered.

3. If the feature, in the embodiment, is the Redcap, the UE (100) informs the gNB that random access was attempted applying featuring specific RACH for Redcap.
4. If the feature, in the embodiment, is the coverage enhancement, the UE (100) informs the gNB that random access was attempted applying featuring specific RACH for coverage enhancement. Further, the UE (100) sends the number of group A/group-B msg3 transmissions performed during RACH procedure to the gNB. The UE (100) also sends measured DLRSRP at the time of Msg3repetition and whether the msg3transmission was successful with coverage enhancements to gNB. The UE (100) may report msg3 transmission has failed, even when coverage enhancement feature is disabled there by prompting operator to deploy coverage enhancements.
5. If the feature, in the embodiment, is slicing, the UE (100) informs the gNB that random access was attempted applying feature specific RACH for slicing. The UE (100) also informs gNB the slice-group identifier or the slice identifier applied for selecting the slice specific RACH resources/parameters.
6. If the UE (100) has applied RA prioritization for a specific feature, the UE may also include the RA prioritization parameters applied, in case such parameters are received in a dedicated RRC message.
7. If a fallback has occurred from a feature specific RACH to a common RACH, the UE (100) informs the gNB that such a fallback has occurred. The UE (100) also indicates the maximum number of random access attempts for each RA-type (2 step/4 step) for feature specific RACH before the fallback.
8. The UE (100) may send the measured RSRP before performing feature specific RACH and the received RSRP threshold for selecting feature specific RACH (if it was received by the UE (100) in DCCH) to the gNB. If the UE (100) is configured with UE specific PRACH mask or other dedicated RACH parameters, the UE (100) may also send that PRACH mask value and other dedicated RACH parameter's value to the gNB.

a. In an option, the UE (100) may set all this information after the successful completion of random access procedure or during the detection of radio link failure (RLF) or during the connection establishment failure like expiry of timers T300 or T319 during RRC procedures like RRC connection establishment or RRC connection resume in var-RAReport, var-RLFReport, varConnEstFailReportetc. Further, the UE (100) will send the UE information response with RA report/RLF report/ConnEstFailReporton receiving RRC message UE information Request with the ra-ReportReq/rlf-reportReq/cef-ReportReq set to true.

On receiving the RRC message including the details of feature specific random access resource selection, a gNBRRC in gNB CU may forward it to gNB DU and to a SON controller, for e.g., in OAM module. The SON controller in CU/DU or the SON controller outside gNB can identify if the amount of resources allocated for a particular feature or a particular scenario within the feature (for e.g. resources for a particular slice-group or a preamble group for SDT) is optimum based on the received information. Further, the resources allocated per feature or per slice-group could be increased or decreased based on the received information. The SON controller in the network may also adapt the criteria for using the feature specific random access resources and other RACH parameters based on the received information from the UE (100). Examples of some of the parameters which may be optimized based on the methods specified are given below.

a) SSB selection related parameters, i.e., rsrp-Threshold-SSB, msgA-RSRP-ThresholdSSB.
b) Power control related parameters, i.e., preambleReceivedTargetPower/msgA-PreambleReceivedTarget-Power, powerRampingStep/msgA-PreamblePower-Ram pingStep, msg3-DeltaPreamble/msgA-DeltaPreamble.
c) Preamble group related parameters, i.e., msg3-DeltaPreamble/msgA-DeltaPreamble, messagePowerOff-setGroupB for 2-step RA and 4-step RA.
d) ra-Msg3SizeGroupA, messagePowerOffsetGroupB and numberOfRA-PreamblesGroupA when Preamble Group B is configured, msg3 repetitions etc.

An example including a subset of the possible changes in TS 38.331 according to the embodiments of the invention are given below.

RA information determination for RA report and RLF report—The UE (100) shall set the content in ra-InformationCommon as follows—

1> If the random access procedure is initialized with the random access resources for the feature SDT 2> set the RARelatedFeature to SDT.

2> set the maxNumberofFeature2stepRA to the maximum number of 2 step RA initiated with SDT RACH 2> set the maxNumberofFeature4stepRA to the maximum number of 4 step RA initiated with SDT RACH 2> If fallback from SDT-RA to normal RA has happened, set the fallbackFrom-FeatureRA to true.

2> set the MessageSizeSDT to the size of message carried in MSGA or MSG3.

2> set the SDTpreambleGroup to the preamble group selected for RA-SDT.

2> set the measuredDLRSRP to the RSRP measured at the time of selection of SDT RACH.

1> If the random access procedure is initialized with the random access resources for the feature covEnh 2> set the RARelatedFeatureto covEnh.

2> set the maxNumberofFeature4stepRA to the maximum number of 4 step RA initiated with RACH resources for coverage enhancements.

2> If fallback from CovEnh-RA to normal RA has happened, set the fallbackFrom-FeatureRA to true.

2> set the measuredDLRSRP to the RSRP measured at the time of selection of coverage enhancement RACH.

2> If the UE (100) has repeated msg3 transmission for group-A, set num-GroupAMsg3Repetitions to the number of msg3 repetitions in group A.

2> If the UE (100) has repeated msg3 transmission for group-B, set num-GroupBMsg3Repetitions to the number of msg3 repetitions in group B.

2> If the msg3 transmission was unsuccessful with the coverage enhancements, set msg3SuccessfulCovEnh as false.

1> If the random access procedure is initialized with the random access resources for the feature Redcap 2> set the RARelatedFeatureto Redcap.

2> set the maxNumberofFeature2stepRA to the maximum number of 2 step RA initiated with RACH resources for REDCAP.

2> set the maxNumberofFeature4stepRA to the maximum number of 4 step RA initiated with RACH resources for REDCAP.

2> If fallback from REDCAP-RA to normal RA has happened, set the fallbackFrom-FeatureRA to true.

2> set the measuredDLRSRP to the RSRP measured at the time of selection of REDCAP RACH.

1> If the random access procedure is initialized with the random access resources for the feature slicing 2> set theRARelatedFeatureto Slicing.

2> set the RAResourceSliceGroupId to the slice group UE (100) has used for random access resource selection 2> set the maxNumberofFeature2stepRA to the maximum number of 2 step RA initiated with RACH resources for slicing.

2> set the maxNumberofFeature4stepRA to the maximum number of 4 step RA initiated with RACH resources for slicing.

2> If fallback from Slice specific RACH to normal RA has happened, set the fall-backFromFeatureRA to true.

2> set the measuredDLRSRP to the RSRP measured at the time of selection of slice specific RACH.

An example set of information elements in TS 38.331 is given below:

```
RA-InformationCommon-r16 ::=   SEQUENCE {
<other fields>
featureSpecificRAresourceInfo-r18
<other fields>
}
FeatureSpecificRAresourceInfo-r18 ::=   SEQUENCE {
RARelatedFeatureENUMERATED   {SDT,CovEnh,Redcap,Slicing}
OPTIONAL
maxNumberofFeature2stepRA INTEGER (0..64) OPTIONAL
maxNumberofFeature4stepRA INTEGER (0..64) OPTIONAL
fallbackFromFeatureRAenum {true} OPTIONAL
measuredDLRSRP INTEGER (0..40) OPTIONAL
SDTpreambleGroup INTEGER (0..1) OPTIONAL
SDTbearerID LIST OF INTEGER (1..31)
RAResourceslicegroupId INTEGER (0..256) OPTIONAL
measuredDLRSRPMsg3Rep INTEGER (0..40) OPTIONAL
numGroupAMsg3Repetitions INTEGER (0..8) OPTIONAL
numGroupBMsg3Repetitions INTEGER (0..8) OPTIONAL
msg3SuccessfulCovEnh enum {false} OPTIONAL
}
```

FIG. 2 illustrates various hardware components of the UE (100), according to the embodiments as disclosed herein.

In an embodiment, the UE (100) includes a processor (110), a communicator (120), a memory (130) and a feature specific RACH controller (140). The processor (110) is coupled with the communicator (120), the memory (130) and the feature specific RACH controller (140).

Further, the feature specific RACH controller (140) stores the feature specific RACH information corresponding to the feature specific RACH applied by the UE (100) upon detecting that the UE (100) selects the random access resource configured for the feature specific RACH while performing the random access procedure. The feature specific RACH is applied for one of the Small Data Transmission (SDT), coverage enhancement, the Reduced Capacity (Redcap), and the network slicing. Further, the feature specific RACH controller (140) sends the feature specific RACH information to the network device (200).

In an embodiment, the feature specific RACH controller (140) detects that the feature specific RACH information applied by the UE (100) is for the SDT. Based on the detection, the feature specific RACH controller (140) sends the feature specific RACH information by including at least one of the random access (RA) related feature indicating the SDT, a maximum number of feature 2 steps RA initiated with the SDT, a maximum number of feature 4 steps RA initiated with the SDT, an indication of fallback from the applied feature specific RACH for the SDT, when the fallback from the applied feature specific RACH for the SDT to a normal RACH has happened, a Message Size SDT indicating a size of message carried in MSGA or MSG3 including headers, a SDT preamble Group indicating a preamble group selected for the applied feature specific RACH for the SDT, and a measured DL RSRP indicating a RSRP measured at a time of selection of the applied feature specific RACH for the SDT.

In an embodiment, the feature specific RACH controller (140) detects that the feature specific RACH information applied by the UE (100) is for the coverage enhancement. Based on the detection, the feature specific RACH controller (140) sends the feature specific RACH information by including at least one of a RA related feature indicating the coverage enhancement, a maximum number of feature 4 steps RACH initiated with RACH resources for the coverage enhancement, the indication of fallback from the applied feature RACH for the coverage enhancement, when the fallback from the applied feature RACH for the coverage enhancement to a normal RA has happened, a measured down link (DL) Reference Signal Received Power (RSRP) indicating a RSRP measured at a time of selection of the applied feature RACH for the coverage enhancement, A number of msg3 repetitions in group A when the UE (100) has repeated msg3 transmission for the group A, A number of msg3 repetitions in group B when the UE (100) has repeated msg3 transmission for the group B, and an information whether msg3 transmission was successful or unsuccessful with the coverage enhancements.

In an embodiment, the feature specific RACH controller (140) detects that the feature specific RACH information applied by the UE (100) is for the Redcap. Based on the detection, the feature specific RACH controller (140) sends the feature specific RACH information by including at least one of a RA related feature indicating the Redcap, a maximum number of feature 2 steps RA initiated RACH resources for the Redcap, a maximum number of feature 4 steps RA initiated RACH resources for the Redcap, an indication of the fallback from the applied feature specific RACH for the Redcap, when the fallback from the applied feature specific RACH for the Redcap to a normal RA has happened, and a measured DL RSRP indicating a RSRP measured at a time of selection of the applied feature specific RACH for the Redcap.

In an embodiment, the feature specific RACH controller (140) detects that the feature specific RACH information applied by the UE (100) is for the network slicing. Based on the detection, the feature specific RACH controller (140) sends the feature specific RACH information by including at least one of a RA related feature indicating the network slicing, a maximum number of feature 2 steps RA initiated RACH resources for the network slicing, a maximum number of feature 4 steps RA initiated RACH resources for the network slicing, an indication of the fallback from the applied feature specific RACH for the network slicing, when the fallback from the applied feature specific RACH for the network slicing to a normal RA has happened, and a measured DL RSRP indicating a RSRP measured at a time of selection of the applied feature specific RACH for the network slicing.

Further, the feature specific RACH controller (140) applies whether the feature specific RACH in the wireless network (300) for one of the SDT, the coverage enhancement, the Reduced Capacity (Redcap), and the network slicing. Further, the feature specific RACH controller (140) stores the feature specific RACH information comprising at least one of a RA related feature indicating the applied feature specific RACH, a maximum number of feature 2 steps RA initiated RACH resources for the applied feature specific RACH, a maximum number of feature 4 steps RA initiated RACH resources for the applied feature specific RACH, the indication of fallback from the applied feature specific RACH, when the fallback from the applied feature specific RACH to a normal RA has happened, and a measured DL RSRP indicating a RSRP measured at a time of selection of the applied feature specific RACH, A number of msg3 repetitions in group A when the UE (100) has repeated msg3 transmission for the group A, A number of msg3 repetitions in group B when the UE (100) has repeated msg3 transmission for the group B, an information whether msg3 transmission was successful or unsuccessful with the coverage enhancements, a Message Size SDT indicating a size of message carried in MSGA or MSG3 including headers, a preamble Group indicating a preamble group selected for the applied feature specific RACH, the slice group identifiers applied for random access resource selection, and the slice identifiers applied for random access resource selection.

The feature specific RACH controller (140) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor (110) is configured to execute instructions stored in the memory (130) and to perform various processes. The communicator (120) is configured for communicating internally between internal hardware components and with external devices via one or more networks. The memory (130) also stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, in an embodiment, the memory (130) may, be considered a non-transitory storage medium. The term "non-transitory" may indicate that the storage medium is not embodied in a carrier wave or a propagated signal. However, the term "non-transitory" should not be interpreted that the memory (230) is non-movable. In certain examples, a non-transitory storage medium may store data that can, over time, change (e.g., in Random Access Memory (RAM) or cache).

Although the FIG. 2 shows various hardware components of the UE (100) but it is to be understood that other embodiments are not limited thereon. In other embodiments, the UE (100) may include less or more number of components. Further, the labels or names of the components are used only for illustrative purpose and does not limit the scope of the invention. One or more components can be combined together to perform same or substantially similar function in the UE (100).

FIG. 3 illustrates various hardware components of the network device (200), according to the embodiments as disclosed herein. In an embodiment, the network device (200) includes a processor (210), a communicator (220), a memory (230) and a feature specific RACH controller (240). The processor (210) is coupled with the communicator (220), the memory (230) and the feature specific RACH controller (240).

The feature specific RACH controller (240) sends the information request with the network event to the UE (100) in the wireless network (300). The network event can be, for example, but not limited to a receiving a radio resource control (RRC) message UE information request, a successful completion of a RACH procedure, detection of a radio link failure (RLF), detection of a connection establishment failure during a RRC procedure, detection of a connection establishment failure due to expiry of a timer, and detection of a connection establishment failure (CEF).

Further, the feature specific RACH controller (240) receives the information response comprising the feature specific RACH information corresponding to the feature specific RACH by the UE (100). The feature specific RACH is applied for one of the SDT, coverage enhancement, a Redcap, and network slicing.

In an embodiment, the feature specific RACH is applied for the SDT, the applied feature specific RACH comprises at least one of a RA related feature indicating the SDT, a maximum number of feature 2 steps RA initiated with the SDT, a maximum number of feature 4 steps RA initiated with the SDT, the indication of fallback from the applied feature specific RACH for the SDT, when the fallback from the applied feature specific RACH for the SDT to a normal RACH has happened, a Message Size SDT indicating a size of message carried in MSGA or MSG3 including headers, a SDT preamble Group indicating a preamble group selected for the applied feature specific RACH for the SDT, and a measured DL RSRP indicating a RSRP measured at a time of selection of the applied feature specific RACH for the SDT.

In another embodiment, the feature specific RACH is applied for the coverage enhancement, wherein the applied feature specific RACH comprises at least one of a RA related feature indicating the coverage enhancement, a maximum number of feature 4 steps RACH initiated with RACH resources for the coverage enhancement, the indication of fallback from the applied feature RACH for the coverage enhancement, when the fallback from the applied feature RACH for the coverage enhancement to a normal RA has happened, a measured DL RSRP indicating a RSRP measured at a time of selection of the applied feature RACH for the coverage enhancement, A number of msg3 repetitions in group A when the UE (100) has repeated msg3 transmission for the group A, A number of msg3 repetitions in group B when the UE (100) has repeated msg3 transmission for the group B, and an information whether msg3 transmission was successful or unsuccessful with the coverage enhancements.

In another embodiment, the feature specific RACH is applied for the Redcap, the applied feature specific RACH comprises at least one of a RA related feature indicating the Redcap, a maximum number of feature 2 steps RA initiated RACH resources for the Redcap, a maximum number of feature 4 steps RA initiated RACH resources for the Redcap, an indication of fallback from the applied feature specific RACH for the Redcap, when the fallback from the applied feature specific RACH for the Redcap to a normal RA has happened, and a measured DL RSRP indicating a RSRP measured at a time of selection of the applied feature specific RACH for the Redcap.

In another embodiment, the feature specific RACH is applied for the network slicing, the applied feature specific RACH comprises at least one of a RA related feature indicating the network slicing, a maximum number of feature 2 steps RA initiated RACH resources for the network slicing, a maximum number of feature 4 steps RA initiated RACH resources for the network slicing, an indication of fallback from the applied feature specific RACH for the network slicing, when the fallback from the applied feature specific RACH for the network slicing to a normal RA has happened, and a measured DL RSRP indicating a RSRP measured at a time of selection of the applied feature specific RACH for the network slicing.

Further, the feature specific RACH controller (240) optimizes the network parameters related to random access based on the feature specific RACH information received from the UE (100). The network parameters can be, for example, but not limited to SSB selection related parameters, power control related parameters, preamble group related parameters, and group related parameters.

In an embodiment, the feature specific RACH controller (240) sends the applied feature specific RACH information received from the UE (100) to the DU of the network device (200) using the CU of the network device (200). Further, the feature specific RACH controller (240) sends the applied feature specific RACH information received from the UE (100) to the SON controller of the network device (200) using the CU of the network device (200). Further, the feature specific RACH controller (240) optimizes the various network parameters related to random access based on the applied feature specific RACH information using the SON controller of the network device (200).

The feature specific RACH controller (240) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor (210) is configured to execute instructions stored in the memory (230) and to perform various processes. The communicator (220) is configured for communicating internally between internal hardware components and with external devices via one or more networks. The memory (230) also stores instructions to be executed by the processor (210). The memory (230) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (230) may, in some examples, be considered a non-transitory storage medium. The term "non-transitory" may indicate that the storage medium is not embodied in a carrier wave or a propagated signal. However, the term "non-transitory" should not be interpreted that the memory (230) is non-movable. In certain examples, a non-transitory storage medium may store data that can, over time, change (e.g., in Random Access Memory (RAM) or cache).

Although the FIG. 3 illustrates various hardware components of the network device (200) but it is to be understood that other embodiments are not limited thereon. In other embodiments, the network device (200) may include less or more number of components. Further, the labels or names of the components are used only for illustrative purpose and does not limit the scope of the invention. One or more components can be combined together to perform same or substantially similar function in the network device (200).

FIG. 4 is a flow chart (S400) illustrating a method, implemented by the UE (100), for self-optimization of the RACH in the wireless network (300), according to the embodiments as disclosed herein. The operations (S402 and S404) are handled by the feature specific RACH controller (140).

At S402, the method includes storing the feature specific RACH information corresponding to the feature specific RACH applied by the UE (100). The feature specific RACH is applied for one of the SDT, the coverage enhancement, the Redcap, and the network slicing. At S404, the method includes sending the feature specific RACH information to the network device (200).

FIG. 5 is a flow chart (S500) illustrating a method, implemented by the network device (200), for self-optimization of the RACH in the wireless network (300), according to the embodiments as disclosed herein. The operations (S502-S506) are handled by the feature specific RACH controller (140).

At S502, the method includes sending the information request with the network event to the UE (100) in the wireless network (300). The network event can be, for example, but not limited to a receiving a radio resource control (RRC) message UE information request, a successful completion of a RACH procedure, detection of a radio link failure (RLF), detection of a connection establishment failure during a RRC procedure, detection of a connection establishment failure due to expiry of a timer, and detection of a connection establishment failure (CEF). At S504, the method includes receiving the information response comprising feature specific RACH information corresponding to the feature specific RACH by the UE (100). The feature specific RACH is applied for one of the SDT, coverage enhancement, a Redcap, and network slicing. At S506, the method includes optimizing the various network parameters related to random access based on the feature specific RACH information received from the UE (100). The network parameters can be, for example, but not limited to SSB selection related parameters, power control related parameters, preamble group related parameters, and group related parameters.

FIG. 6 illustrates an example flow chart scenario (S600) of storing feature specific RACH information in the UE (100), according to the embodiments as disclosed herein. The operations (S602-S606*d*) are handled by the feature specific RACH controller (140).

At S602, the RACH is completed successfully/RLF/CEF. The RACH is applied based on the feature. At S604, the method includes storing the DL RSRP at which the feature is selected, the RA prioritisation information, whether fallback occurred, maximum number of feature specific 2 step and/or 4 step RA attempts.

At S606*a*, the method includes storing the feature specific RACH information by including at least one of the RA related feature indicating the SDT, the maximum number of feature 2 steps RA initiated with the SDT, the maximum number of feature 4 steps RA initiated with the SDT, the indication of fallback from the applied feature specific RACH for the SDT, when the fallback from the applied feature specific RACH for the SDT to a normal RACH has happened, the Message Size SDT indicating a size of message carried in MSGA or MSG3 including headers, the SDT preamble Group indicating the preamble group selected for the applied feature specific RACH for the SDT, and the measured DL RSRP indicating the RSRP measured at a time of selection of the applied feature specific RACH for the SDT.

At S606*b*, the method includes storing the feature specific RACH information by including at least one of the RA related feature indicating the coverage enhancement, the maximum number of feature 4 steps RACH initiated with RACH resources for the coverage enhancement, the indication of fallback from the applied feature RACH for the coverage enhancement, when the fallback from the applied feature RACH for the coverage enhancement to the normal RA has happened, the measured DL RSRP indicating the RSRP measured at a time of selection of the applied feature RACH for the coverage enhancement, the number of msg3 repetitions in group A when the UE has repeated msg3 transmission for the group A, the number of msg3 repetitions in group B when the UE (100) has repeated msg3 transmission for the group B, and the information whether msg3 transmission was successful or unsuccessful with the coverage enhancements.

At S606*c*, the method includes storing the feature specific RACH information by including at least one of the RA related feature indicating the Redcap, the maximum number of feature 2 steps RA initiated RACH resources for the Redcap, a maximum number of feature 4 steps RA initiated RACH resources for the Redcap, the indication of fallback from the applied feature specific RACH for the Redcap, when the fallback from the applied feature specific RACH for the Redcap to the normal RA has happened, and the measured DL RSRP indicating the RSRP measured at a time of selection of the applied feature specific RACH for the Redcap.

At S606*d*, the method includes storing the feature specific RACH information by including at least one of the RA related feature indicating the network slicing, the slice group identifiers considered for random access resource selection, the slice identifiers considered for random access selection, a maximum number of feature 2 steps RA initiated RACH resources for the network slicing, a maximum number of feature 4 steps RA initiated RACH resources for the network slicing, the indication of fallback from the applied feature specific RACH for the network slicing, when the fallback from the applied feature specific RACH for the network slicing to a normal RA has happened, and a measured DL RSRP indicating a RSRP measured at a time of selection of the applied feature specific RACH for the network slicing.

FIG. 7 illustrates an example scenario of reporting feature specific RACH information to the network device (200) (e.g., gNB or the like), according to the embodiments as disclosed herein.

At 702, the network device (200) sends the UE information request with at least one of connestfailreportreq, ra-reportreq, rlf-reportreq or any similar report req set to true to the UE (100). At 704, the UE (100) includes the feature specific RACH information for SON. At 706, the UE (100) sends the UE information response including the feature specific RACH information for the SON to the network device (200).

The various actions, acts, blocks, steps, or the like in the flow charts at FIG. 4 through FIG. 6 may be performed in the order presented, in a different order or simultaneously. Further, in some embodiments, some of the actions, acts, blocks, steps, or the like may be omitted, added, modified, skipped, or the like without departing from the scope of the invention.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

FIG. 8 is a block diagram illustrating a structure of a UE according to an embodiment of the disclosure. Furthermore, the UE may correspond to UE of FIG. 1 and FIG. 2.

As shown in FIG. 8, the UE according to an embodiment may include a transceiver 810, a memory 820, and a processor 830. The transceiver 810, the memory 820, and the processor 830 of the UE may operate according to a communication method of the UE described above. However, the components of the UE are not limited thereto. For example, the UE may include more or fewer components than those described above. In addition, the processor 830, the transceiver 810, and the memory 820 may be implemented as a single chip. Also, the processor 830 may include at least one processor.

The transceiver 810 collectively refers to a UE receiver and a UE transmitter, and may transmit/receive a signal to/from a base station or a network entity. The signal transmitted or received to or from the base station or a network entity may include control information and data. The transceiver 810 may include a RF transmitter for up-converting and amplifying a frequency of a transmitted signal, and a RF receiver for amplifying low-noise and down-converting a frequency of a received signal. However, this is only an example of the transceiver 810 and components of the transceiver 810 are not limited to the RF transmitter and the RF receiver.

Also, the transceiver 810 may receive and output, to the processor 830, a signal through a wireless channel, and transmit a signal output from the processor 830 through the wireless channel.

The memory 820 may store a program and data required for operations of the UE. Also, the memory 820 may store control information or data included in a signal obtained by the UE. The memory 820 may be a storage medium, such as read-only memory (ROM), random access memory (RAM), a hard disk, a CD-ROM, and a DVD, or a combination of storage media.

The processor 830 may control a series of processes such that the UE operates as described above. For example, the transceiver 810 may receive a data signal including a control signal transmitted by the base station or the network entity, and the processor 830 may determine a result of receiving the control signal and the data signal transmitted by the base station or the network entity.

FIG. 9 is a block diagram illustrating a structure of a base station according to an embodiment of the disclosure. Furthermore, the base station may correspond to network device of FIG. 3.

As shown in FIG. 9, the base station according to an embodiment may include a transceiver 910, a memory 920, and a processor 930. The transceiver 910, the memory 920, and the processor 930 of the base station may operate according to a communication method of the base station described above. However, the components of the base station are not limited thereto. For example, the base station may include more or fewer components than those described above. In addition, the processor 930, the transceiver 910, and the memory 920 may be implemented as a single chip. Also, the processor 930 may include at least one processor.

The transceiver 910 collectively refers to a base station receiver and a base station transmitter, and may transmit/receive a signal to/from a terminal or a network entity. The signal transmitted or received to or from the terminal or a network entity may include control information and data. The transceiver 910 may include a RF transmitter for up-converting and amplifying a frequency of a transmitted signal, and a RF receiver for amplifying low-noise and down-converting a frequency of a received signal. However, this is only an example of the transceiver 910 and components of the transceiver 910 are not limited to the RF transmitter and the RF receiver.

Also, the transceiver 910 may receive and output, to the processor 930, a signal through a wireless channel, and transmit a signal output from the processor 930 through the wireless channel.

The memory 920 may store a program and data required for operations of the base station. Also, the memory 920 may store control information or data included in a signal obtained by the base station. The memory 920 may be a storage medium, such as read-only memory (ROM), random access memory (RAM), a hard disk, a CD-ROM, and a DVD, or a combination of storage media.

The processor 930 may control a series of processes such that the base station operates as described above. For example, the transceiver 910 may receive a data signal including a control signal transmitted by the terminal, and the processor 930 may determine a result of receiving the control signal and the data signal transmitted by the terminal.

The invention claimed is:

1. A method performed by a user equipment (UE) in a wireless communication system, the method comprising:

receiving, from a base station, a request message including first information indicating to report information for a random access;

including random access information in a response message, wherein the random access information includes second information for a feature associated with a random access resource used in the random access; and transmitting, to the base station, the response message as a response to the request message, wherein the feature includes at least one of a small data transmission (SDT), a reduced capacity (RedCap), or a slicing, and wherein, in case that the feature includes the slicing, at least one group identifier associated with a slice is included in the second information.

2. The method of claim 1, wherein in case that the feature includes the SDT, the second information further includes information indicating a size of data for the SDT.

3. The method of claim 1, wherein the feature further includes a coverage enhancement, and wherein the coverage enhancement includes a feature of msg3 repetition.

4. The method of claim 1, wherein the random access information is included in a random access report, a radio link failure (RLF) report, or a connection establishment failure (CEF) report.

5. A method performed by a base station in a wireless communication system, the method comprising:

transmitting, to a user equipment (UE), a request message including first information indicating to report information for a random access; and receiving, from the UE, a response message as a response to the request message, wherein the response message includes random access information including second information for a feature associated with a random access resource used in the random access, wherein the feature includes at least one of a small data transmission (SDT), a reduced capacity (RedCap), or a slicing, and wherein, in case that the feature includes the slicing, at least one group identifier associated with a slice is included in the second information.

6. The method of claim 5, wherein in case that the feature includes the SDT, the second information further includes information indicating a size of data for the SDT.

7. The method of claim 5, wherein the feature further includes a coverage enhancement, and wherein the coverage enhancement includes a feature of msg3 repetition.

8. The method of claim 5, wherein the random access information is included in a random access report, a radio link failure (RLF) report, or a connection establishment failure (CEF) report.

9. A user equipment (UE) in a wireless communication system, the UE comprising:

a transceiver; and a controller coupled with the transceiver and configured to:

receive, from a base station, a request message including first information indicating to report information for a random access, include random access information in a response message, wherein the random access information includes second information for a feature associated with a random access resource used in the random access, and transmit, to the base station, the response message as a response to the request message, wherein the feature includes at least one of a small data transmission (SDT), a reduced capacity (RedCap), or a slicing, and wherein, in case that the feature includes the slicing, at least one group identifier associated with a slice is included in the second information.

10. The UE of claim 9, wherein in case that the feature includes the SDT, the second information further includes information indicating a size of data for the SDT.

11. The UE of claim 9, wherein the feature further includes a coverage enhancement, and wherein the coverage enhancement includes a feature of msg3 repetition.

12. The UE of claim 9, wherein the random access information is included in a random access report, a radio link failure (RLF) report, or a connection establishment failure (CEF) report.

13. A base station in a wireless communication system, the base station comprising:

a transceiver; and a controller coupled with the transceiver and configured to:

transmit, to a user equipment (UE), a request message including first information indicating to report information for a random access, and receive, from the UE, a response message as a response to the request message, wherein the response message includes random access information including second information for a feature associated with a random access resource used in the random access, wherein the feature includes at least one of a small data transmission (SDT), a reduced capacity (RedCap), or a slicing, and wherein, in case that the feature includes the slicing, at least one group identifier associated with a slice is included in the second information.

14. The base station of claim 13, wherein in case that the feature includes the SDT, the second information further includes information indicating a size of data for the SDT.

15. The base station of claim 13, wherein the feature further includes a coverage enhancement, and wherein the coverage enhancement includes a feature of msg3 repetition.

16. The base station of claim 13, wherein the random access information is included in a random access report, a radio link failure (RLF) report, or a connection establishment failure (CEF) report.

* * * * *